July 21, 1964   A. T. RANDALL   3,141,255
FISH LURE
Filed Dec. 26, 1961   2 Sheets-Sheet 1
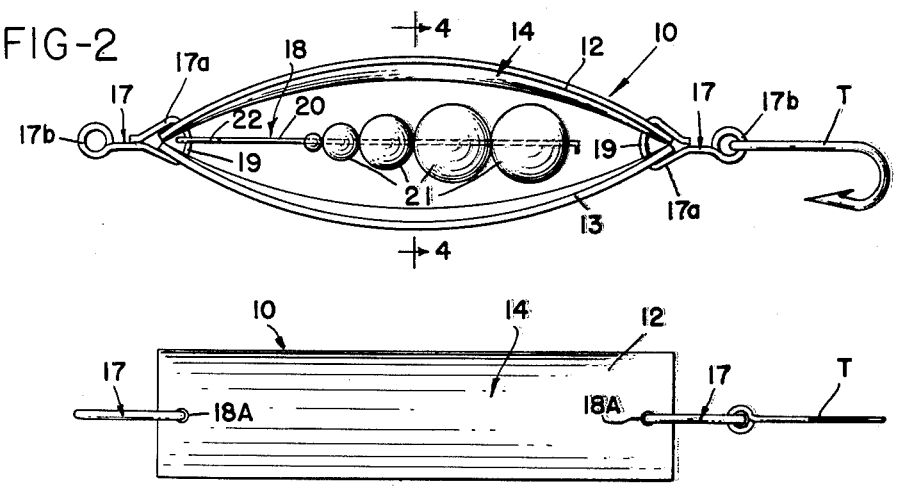
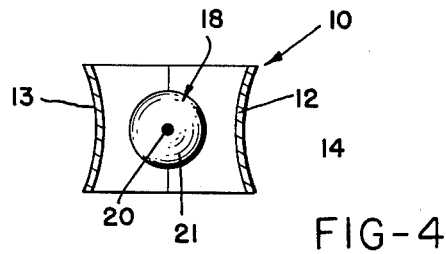
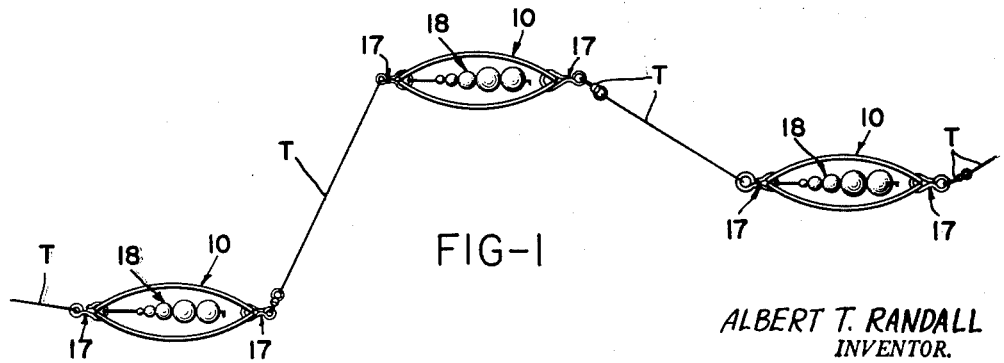
ALBERT T. RANDALL
INVENTOR.
BY July 21, 1964     A. T. RANDALL     3,141,255

FISH LURE

Filed Dec. 26, 1961     2 Sheets-Sheet 2

ALBERT T. RANDALL
INVENTOR

BY *[signature]*

United States Patent Office 3,141,255
Patented July 21, 1964

3,141,255
FISH LURE
Albert T. Randall, 222 E. Pine St., Missoula, Mont.
Filed Dec. 26, 1961, Ser. No. 162,076
7 Claims. (Cl. 43—42.11)

This invention relates to fishing tackle and more particularly to a lure especially adapted for producing erratic motions intended to attract fish.

It is a principal object of the invention to provide a fish lure which is highly efficient and effective in luring fish to be caught.

A further object of the invention lies in the provision of a fish lure which is simple and economical to construct and which is rugged and long lasting.

Yet another object of the present invention lies in the provision of a lure which, when there is relative movement of the lure and water, darts from side to side, thus following a zig-zag path during its use.

A feature of the present invention lies in the combining with a sistroid body, means of imbalance, causing the lure to twist about its longitudinal axis both at an erratic r.p.m. and in opposed directions.

These and other objects and novel features of the present invention are more clearly and fully understood from the following specification and claims.

In the accompanying drawings, wherein preferred and modified forms of the invention are disclosed, like numerals are employed to designate similar parts. It should be understood, however, that the drawings are exemplifying only and are not intended to limit the scope of the invention beyond that expressly recited in the appended claims.

In the drawings:

FIGURE 1 is an elevational view of a series of fish lures incorporated in fishing tackle;

FIGURE 2 is an enlarged side elevation of my improved fish lure;

FIGURE 3 is a plan view on the scale of FIGURE 2;

FIGURE 4 is a lateral sectional view taken on a plane substantially indicated by line 4—4 of FIGURE 2;

Figure 7:
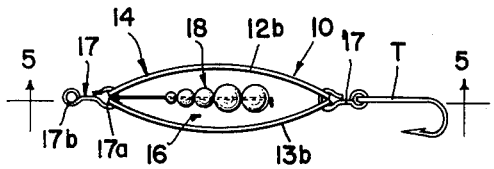
FIGURE 7 is an elevational view on a reduced scale, of a modified fish lure.

In FIGURE 1, each lure is indicated in general by the numeral 10. Any number of lures 10 may be interconnected by fishing tackle collectively indicated by reference letter T which includes the line, leader, fish hooks, swivels, and other similar tackle.

In its completed form, the fish lure 10 is comprised of a sistroid body 14 which is formed by a pair of curvilinear strips 12 and 13 disposed with their longitudinal centers, bowed away from each other and with their ends superposed. Each of the strips 12 and 13 is provided with an aperture 18a at each end and each aperture 18a is disposed substantially in registry with the aperture of the companion end of the opposed strip, thus constituting a pair of aligned apertures at each end and so swaged as to rigidly secure the strips 12 and 13 to form the composite sistroid body 14.

The attachments 17 are comprised of a pair of interconnected rings 17a and 17b (FIGURES 2, 7 and 10) and it will be seen that a portion 19 of each ring 17a extends within and between the curvilinear strips 12 and 13 through the apertures 18a to provide fastening means 19 for a pendulum 18. To each of the eyes 17b, tackle T may be secured according to the choice and discretion of the fisherman employing the lure 10.

Figure 10:
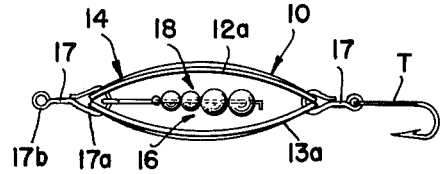
FIGURE 10 is an elevation of another modified fish lure.
Figure 8:
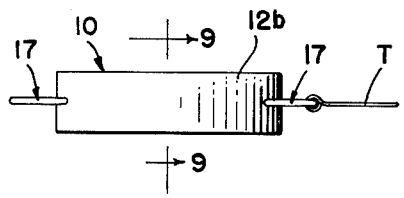
FIGURE 8 is a plan view of the lure of FIGURE 7.
Figure 11:
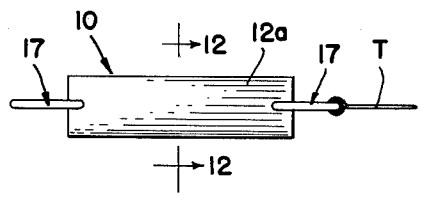
FIGURE 11 is a plan view of the fish lure of FIGURE 10.
Figure 9:
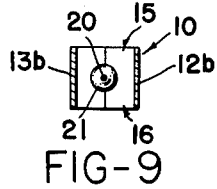
FIGURE 9 is a lateral section taken substantially on the plane indicated by line 9—9 of FIGURE 8.
Figure 12:
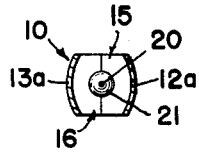
FIGURE 12 is a lateral section taken substantially on the plane indicated by line 12—12 of FIGURE 11.
Figure 6:
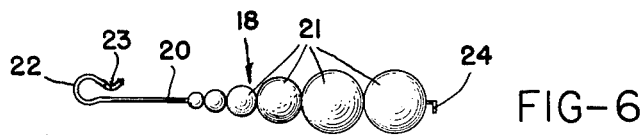
FIGURE 6 is an elevational view of a pendulum separated from the lure.
Figure 5:
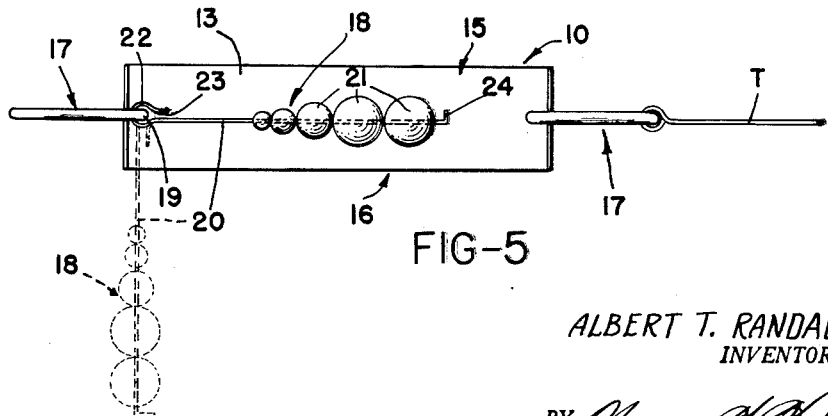
FIGURE 5 is a longitudinal sectional view taken substantially on a plane indicated by line 5—5 of FIGURE 7 and at a slightly reduced scale.

It will be noted that in FIGURES 2, 7, and 10, I have shown modifications in the curvilinear strips 12 and 13. For example, in FIGURES 2, 3, and 4, I have provided the strips with lateral arcs bowed inwardly (see FIGURE 4); whereas in the species disclosed in FIGURES 10, 11 and 12, I have provided the strips with lateral arcs bowed outwardly (see FIGURE 12); and in FIGURES 7, 8, and 9, I have shown the strips 12b and 13b as having no lateral arc.

It is to be understood that the fish lure 10 may be manufactured with each curvilinear strip being of the same material and dimension as its companion strip in some instances, whereas, in other instances I provide one lightweight strip. For example, in FIGURE 9, strip 13b may be comprised of lightweight aluminum, while the opposed strip may be composed of relatively heavy stainless steel. It will thus be seen that the lure may be in rotational imbalance about its axis by altering the weights of materials in the strips. It may also be in rotational imbalance by providing a greater quantity of material in one of the companion strips.

It has been found by controlled tests and careful observation that while there is relative movement between the water and the lure, the rotational imbalance causes an erratic rotation from the dynamics developed during said movements and the sistroid body configuration imparts a movement perpendicular to the opposed open sides 15 and 16.

It is theorized that when a leader is secured on the axis of the lure, for example, in a ring 17b, if it were possible to maintain the leader strictly horizontal, the lure may follow axially along the path of the leader. Since this strict horizontal movement of the leader is not true in practice, it is assumed that the angle of attack of the lure with respect to the water causes the lure to move in the direction of deflection of the leader from the axis, which movement is perpendicular to the open sides 16 and 15.

Why the sistroid configuration causes the lure to rotate is not entirely clear, but it is found to do so.

Thus the lateral movement of the lure from the direction of travel would be up, as viewed in FIGURE 7. When the lure has rotated 90° to the position shown in FIGURE 8, the movement would be horizontal, thus theoretically causing the lure to traverse an arc spaced from the axis of the lure while it is being drawn through the water. For another reason which is not entirely clear, the lure periodically reverses its direction of rotation and moves in the opposite arc, thus causing the lure to traverse an undulatory path through the water, zig-zagging in all directions from a straight axial path of movement.

With the structure thus far described, a reasonably acceptable lure is provided. However, under varying circumstances, it is desired that lures having faster or slower speeds or greater amounts of lateral movements are desired and therefore I have added to a sistroid body 14, preferably but not necessarily, of rotational equilibrium, a pendulum 18 which comprises a rod 20 upon which are secured a number of beads 21 having selected characteristics, for example, weight and size variations. At one end of the rod, each of which may be of a different length, I provide means 22 for hingedly and releasably connecting the pendulum 18 to the fastening means 19. This means 22 is a spring hook having a restricted throat 23. Since the rod 20 is made of spring wire, the hook 22 may be quickly and easily hooked about the fastening means 19 but also may be released when desired by forcing the fastener 19 out of the throat 23 of the hook.

At its opposed end I have shown merely a right angle lip 24 for retaining the beads 21 thereon. Obviously, other means of preventing accidental displacement of beads 21 may be employed if so desired.

The beads 21 on each pendulum may vary in size, weight, and coloration so that each fisherman may select varying combinations of these qualities to permit him to select one from a number of pendulums in his possession. By substituting pendulums in the body 14 one can selectively control to a large degree the action of the lure for the conditions under which it will be used. For example, when the beads 21 are relatively small lightweight plastic beads, the speed of rotation of the lure is relatively fast; whereas, when the beads 21 are heavier, such as, for example, glass beads or metal beads, or larger, the speed of rotation is measurably reduced or confined to a rocking motion.

The principal function of the pendulum is to assist in the erratic zig-zagging or undulations of the lure as it is drawn through the water. As the lure rotates, the pendulum is forced by the water toward the axis of the lure, but when an open wall is presented downwardly to some degree, the weight of the beads causes the pendulum to fall through the open body, thus creating drag on the side from which the pendulum is extending and causing the lure to rotate rather rapidly until the weight of the pendulum has to be raised by this rotation. At such time its rotation is retarded and as the rotation slows down, the lateral movement of the lure increases. When the pendulum is raised above a horizontal position, gravity again causes it to fall through the body and out the lower open side where the action is repeated.

The weight of the pendulum may be varied to control the depth selectively.

It should be borne in mind that the lure may be polished metals or covered with any of the colored finishes now well known in the art.

Having thus described my invention, I desire to secure by Letters Patent of the United States the following:

1. A fish lure which comprises:
   a pair of curvilinear strips of greater lateral width than thickness and of a constant thickness throughout their lengths disposed to form a sistroid body having two opposed open sides and secured together at their ends;
   means at the ends of said body for attachment to fishing tackle; and
   a pendulum hingedly connected at one of its ends to one of said last named means for free swinging movement from side to side of said body through said open sides.

2. The invention defined in claim 1 and further characterized by one said strip being heavier than the other.

3. The invention defined in claim 1 and further characterized by said strips each being additionally laterally arcuate.

4. A fish lure, which comprises:
   a composite sistroid body having two opposed open sides weighted for rotational imbalance;
   means at the ends of said body for attachment to fishing tackle;
   fastening means in said body at one end; and
   a pendulum hingedly and releasably connected to said fastening means for swinging movement from side to side of said body through said open sides.

5. A fish lure, which comprises:
   a pair of curvilinear strips disposed relatively to form a sistroid body having opposed open sides and touching at their ends;
   said strips each having an aperture at each end substantially in registry with an aperture of the companion end of the opposed strip and constituting a pair of aligned apertures;
   an attachment having a ring interconnected with each pair of aligned apertures, securing the strips in said relative disposition, the portion of said ring being disposed within and between said strips constituting a fastening means; and
   a pendulum hingedly and releasably connected to said fastening means for swinging movements from side to side of said body and through said open sides.

6. The fish lure of claim 5 and further characterized by:
   said pendulum having a rod;
   plural beads slidably confined upon said rod; and
   said beads being selected from a quantity thereof having beads of differing weights and sizes.

7. The fish lure of claim 5 and further characterized by:
   each attachment comprising a pair of interconnected rings one of which is accessible at the ends of said body for attachment of fishing tackle.

References Cited in the file of this patent

UNITED STATES PATENTS

| | | |
|---|---|---|
| 839,917 | Chapman | Jan. 1, 1907 |
| 1,914,211 | Novitzky | June 13, 1933 |
| 2,416,834 | Kuslich | Mar. 4, 1947 |
| 2,982,048 | McGarry et al. | May 2, 1961 |
| 2,984,928 | Jenkins | May 23, 1961 |

FOREIGN PATENTS

| | | |
|---|---|---|
| 87,792 | Norway | July 30, 1956 |